Figure 1:
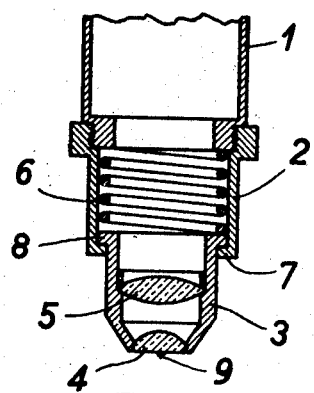

Oct. 8, 1940.　　　H. HANEMANN　　　2,216,943
HARDNESS TESTING INSTRUMENT

Filed Dec. 1, 1938

Inventor:

Heinrich Hanemann

Patented Oct. 8, 1940

2,216,943

UNITED STATES PATENT OFFICE 2,216,943

HARDNESS TESTING INSTRUMENT

Heinrich Hanemann, Berlin - Charlottenburg, Germany, assignor to the firm of Carl Zeiss, Jena, Germany Application December 1, 1938, Serial No. 243,337
In Germany November 30, 1937

6 Claims. (Cl. 265—12)

The hardness of the constituents of a structure has frequently been tested by means of a microscope the objective of which can be exchanged for a penetrating element. This penetrating element, generally a diamond point, is fixed in a mount similar to that of the objective and, to produce an impression, pressed against the part of structure to be tested, the structure being as a rule a polished preparation. Testing the hardness of a structure is effective in the following manner. The spot to be tested is sought by observation through the microscope containing the objective, whereupon this objective is replaced by the penetrating element, which is caused to make an impression and then exchanged for the objective, by means of which the impression is measured through the microscope.

The desired construction of the instrument entailing the necessity of frequently interchanging the microscope objective and the hardness tester proper complicates the proceeding in question comparatively much and makes it require considerable time. The invention, which aims at overcoming this disadvantage, is based on the idea to largely simplify the testing method by using as a hardness tester the microscope objective itself. This problem can be solved by means of a hardness testing instrument comprising a hard penetrating element and a microscope for measuring the impressions caused by this element, if, according to the invention, the penetrating element is disposed on, for instance cemented to, the front, i. e., object-side, lens of the microscope objective. The penetrating element, generally of specially hard mineral, e. g., corundum or diamond, is pyramidal or conical or in the form of a spherical cap. It is possible, however, to use as a penetrating element the front lens itself, the front surface of which is to be in this case for instance in the form of a cone. This construction requires that the material constituting the front lens is sufficiently hard for producing impressions in the material to be tested and, further, that during the microscopic observation an immersion fluid of a refractive index corresponding to that of the penetrating element is between the front lens and the material to be tested. This latter condition holds good even when the front lens has a separate penetrating element whose base covers the entire aperture of this lens. If the penetrating element covers only part of the aperture of the front lens of the microscope objective, observations can be made without an immersion fluid, in which case that part of the front surface of the lens which is covered by the penetrating element is to have a diaphragm stopping down the light rays and thus preventing the imaging rays traversing the penetrating element from disturbing the microscopic image. The penetrating element need not, accordingly, be of a material as transparent as glass but can be any suitable impure, dark-coloured mineral, which is much cheaper than a perfectly colourless crystal.

Exact measuring results depend on the pressure exerted by the penetrating element against the preparation being always the same. Pressures of uniform strength are suitably produced by spring action, for which reason it is convenient to so construct the instrument that at least the object-side part of the microscope objective is fitted to the penetrating element in such a manner as to be elastically displaceable parallel to the optical axis of the objective. An especially advantageous constructional form of the instrument is obtained by making the front lens of the microscope objective consist of two separate parts the one of which, viz. the part which lies on the object side and carries the penetrating element, is displaceable parallel to the optical axis of the objective relatively to the other part, which lies on the image side. This idea can be carried into practice by using as an object-side part of the front lens of the microscope objective a plano-parallel plate having a mount which envelops the mount of the image side part of the front lens, that portion of the plano-parallel plate which covers the free aperture of the image side part of the front lens and this part constituting, together, the front lens. The mount of the plano-parallel plate can be elastically connected to the remaining parts of the microscope objective in such a manner that the one surface of the plano-parallel plate lies direct on the front surface of the other part of the front lens when the said mount is held in its one extreme position against the pressure of the spring, the plano-parallel plate and this other lens part thus constituting the front lens, and that the said mount can be displaced by the spring pressure to its other extreme position, the two parts of the front lens being thus separated, as a consequence of which the penetrating element fast with the plate produces an impression in the preparation.

Figure 4:
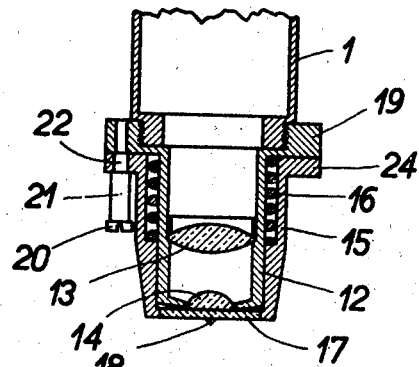
Figure 2:
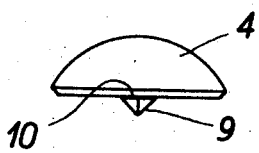
Figure 5:
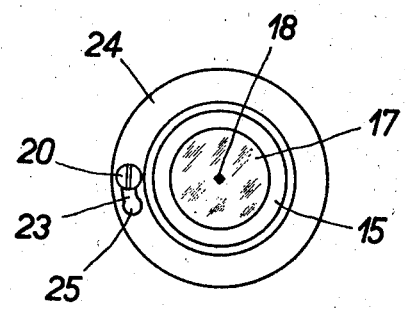
Figure 3:
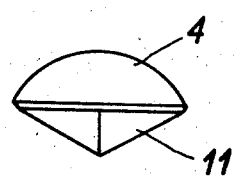

In the accompanying drawing, which illustrates the invention, Figure 1 shows one constructional example in elevational section, Figures 2 and 3 represent parts of this example on an enlarged scale, Figure 4 shows another constructional example in elevational section, and Figure 5 is a view from bottom of this other example.

In the first example (Figure 1), a sleeve 2 is screwed to the tube 1 of a microscope. The mount 3 of a microscope objective consisting of a front lens 4 and a rear lens 5 is displaceable parallel to the optical axis of the microscope in the sleeve 2 against the action of a spring 6. A collar 7 fast with the sleeve 2 and in contact with a collar 8 of the mount 3 causes the optical parts of the objective to assume on the tube 1 the position necessary for observation. The front lens 4 carries at its centre a penetrating element, which is a small diamond pyramid 9. The base of the pyramid 9 (Figure 2) carries an opaque silver layer 10 and is cemented to the front surface of the front lens 4 in such a manner that the vertex of the pyramid 9 lies in the optical axis. In another constructional form (Figure 3), the front surface of the front lens 4 bears a cemented pyramid 11 of highly transparent corundum, whose base covers substantially the entire aperture of the lens 4.

When using the instrument, the spot to be examined of a preparation is sought by means of the microscope and made to lie in the optical axis of the objective, it having to be considered, of course, that in the case of a front lens 4 according to Figure 3 an immersion liquid is required. The microscope tube 1 is now lowered until the penetrating element lies against the preparation and the contact between the two collars 7 and 8 is interrupted against the pressure of the spring 6. The pressure the spring 6 exerts on the mount 3 causes the vertex of the penertating element 9 or 11 to produce an impression at the spot focused at of the preparation. Subsequently thereto, the tube 1 is raised and the microscope made ready for observation, whereupon the produced depression can be measured in the known manner.

The second constructional example (Figures 4 and 5) shows a tube 1 to which is screwed the mount 12 of two lenses 13 and 14. The lens 13 is the rear and the lens 14 the front lens of a microscope objective. On the mount 12 a mount 15 is disposed for displacement parallel to the optical axis of the objective against the pressure of a spring 16. The mount 15 contains a planoparallel glass plate 17 the central part of which lies against the front surface of the lens 14 and constitutes the object-side part of the front lens when the mount 15 assumes its one extreme position. Similarly to the lens 4 of the first example, the glass plate 17 carries a pyramidal penetrating diamond 18 having an opaque base. Into a collar 19 of the mount 12 is screwed a bolt 21 having a head 20. This bolt 21 has a part 22 of smaller diameter which can engage a slit 23 of a collar 24 of the mount 15. At the end of the slit 23 is a bore 25 whose diameter corresponds to the cross-section of the bolt 21 and is smaller than that of the head 20.

When using the instrument, the mount 15 is displaced against the pressure of the spring 16 until the plate 17 is in contact with the lens 14, the bolt 21 gliding in the bore 25. When assuming this position, the mount 15 is so rotated about its axis that the part 22 of the bolt 21 extends into the slot 23 and the mount 15 is held by the bolt 21 in this position. Now the point to be examined of the preparation is sought and focused at in the manner described with reference to the first constructional example. Subsequently thereto, the mount 15 is rotated until the bolt 21 engages the bore 25 and the spring 16 so displaces the mount 15 parallel to the optical axis that the collar 24 touches the head 20. By lowering the tube 1, the penetrating element 18 is made to touch the point to be examined, this lowering of the tube 1 being continued until the collar 22 is raised from the head 20. The spring pressure on the mount 15 causes the vertex of the penetrating element 18 to make an impression at the corresponding place of the preparation, which can be measured by means of the microscope subsequently to the mount 15 having been raised until the parts 14 and 17 touch each other and so rotated that the bolt part 22 engages the slit 23.

I claim:

1. An instrument for testing the hardness of a substance comprising a microscope, said microscope having a microscope objective consisting of a mount and a lens system, and an indentor element of hard material for producing an impression in said substance, said indentor element being mounted upon the front surface of said lens system.

2. An instrument for testing the hardness of a substance comprising a microscope, said microscope having a microscope objective consisting of a mount and a lens system, and an indentor element of hard material for producing an impression in said substance, said indentor element being a tapering body of had mineral, said tapering body having a base, said base being provided with an opaque layer, said base being cemented to and covering only the central part of the front surface of said lens system.

3. An instrument for testing the hardness of a substance, comprising a microscope, said microscope having a microscope objective consisting of a mount and a lens system, and an indentor element of hard material for producing an impression in said substance, said lens system being mounted on said microscope for displacement with said indentor element parallel to the optic axis of said microscope objective, said indentor element being mounted upon the front surface of said lens system.

4. An instrument for testing the hardness of a substance comprising a microscope, said microscope having a microscope objective consisting of a mount and a lens system, and an indentor element of hard material for producing an impression in said substance, said lens system consisting of a front part and a separate rear part, said front part being mounted on said microscope for displacement with said indentor element parallel to the optic axis of said microscope objective, said indentor element being mounted upon the front surface of said front part.

5. An instrument for testing the hardness of a substance comprising a microscope, said microscope having a microscope objective consisting of a mount and a lens system, and an indentor element of hard material for producing an impression in said substance, said lens system consisting of a front lens and at least one separate rear lens, said front lens consisting of a front part and a separate rear part, said front part being mounted on said microscope for displacement with said indentor element parallel to the optic axis of said microscope objective, said indentor element being mounted upon the front surface of said front part.

6. In an instrument according to claim 5, the mount comprising a member carrying said front part and a second member carrying said rear part and said rear lens, said front part being a plano-parallel plate, said member carrying said plano-parallel plate enveloping said second member carrying said rear part.

HEINRICH HANEMANN.